United States Patent
Yoneda et al.

(10) Patent No.: US 7,558,017 B2
(45) Date of Patent: Jul. 7, 2009

(54) MAGNETIC DISK DRIVE AND A LOADING/UNLOADING METHOD

(75) Inventors: Isao Yoneda, Kanagawa (JP); Kazuyuki Ishibashi, Kanagawa (JP); Takeshi Chawanya, Kanagawa (JP); Hiroshi Uchida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/789,770

(22) Filed: Apr. 24, 2007

(65) Prior Publication Data
US 2007/0258163 A1 Nov. 8, 2007

(30) Foreign Application Priority Data
Apr. 24, 2006 (JP) .............................. 2006-119351

(51) Int. Cl.
G11B 21/02 (2006.01)
G11B 5/596 (2006.01)
(52) U.S. Cl. ...................................... 360/75; 360/78.04
(58) Field of Classification Search ....................... None
See application file for complete search history.

(56) References Cited

U.S. PATENT DOCUMENTS 6,148,240 A * 11/2000 Wang et al. .................... 700/63
6,441,988 B2 8/2002 Kang et al.
6,801,384 B2 * 10/2004 Chu et al. ................. 360/78.07
7,180,692 B1 * 2/2007 Che et al. ...................... 360/31
2001/0006439 A1 * 7/2001 Watanabe ................. 360/78.14
2006/0077588 A1 * 4/2006 Shih ........................ 360/78.06

FOREIGN PATENT DOCUMENTS

| JP | 2000-021103 | 1/2000 |
| JP | 2000-123502 | 4/2000 |
| JP | 2001-043645 | 2/2001 |

* cited by examiner

Primary Examiner—Andrew L Sniezek
(74) Attorney, Agent, or Firm—Townsend and Townsend and Crew LLP; Patrick Duncan

(57) ABSTRACT

Embodiments in accordance with the present invention provide a magnetic disk drive with sufficiently low noise. A digital/analog converter supplies to a voice coil motor (VCM) driver a control voltage comprising a first preset voltage value, a second preset voltage value, and a transition voltage value of a substantially cosine wave that interconnects the first preset voltage value and the second preset voltage value. A driving current is supplied from the VCM driver to a voice coil of an actuator assembly. Since a current not containing higher-harmonic components in a transition period flows as a VCM current that flows into the voice coil, vibromotive force can be easily suppressed by shifting a structural resonance point of the entire disk drive including the actuator assembly. In addition, since the back electromotive force occurring in an inductance element is cleared to zero during a half wavelength of period of the cosine wave, speed electromotive force can be measured by immediate shifting from a setting period to a measuring period.

17 Claims, 10 Drawing Sheets

Fig. 9(a) -- Prior Art --

MAGNETIC DISK DRIVE AND A LOADING/UNLOADING METHOD

CROSS-REFERENCE TO RELATED APPLICATION

The instant nonprovisional patent application claims priority to Japanese Application No. 2006-119351, filed Apr. 24, 2006 and incorporated by reference in its entirety herein for all purposes.

BACKGROUND OF THE INVENTION

In general, magnetic disk drives employ a rotary type of actuator assembly. A voice coil motor (VCM) is constructed of a voice coil mounted on the actuator assembly, a VCM magnet that supplies a magnetic flux space to the voice coil, and a VCM yoke that forms a magnetic path. A processor controls the operation of the actuator assembly by regulating the direction and magnitude of an electric current to be supplied to the voice coil. Servo information that a magnetic head has read from a magnetic disk is utilized to control the actuator assembly. Hereinafter, the control of the actuator assembly that utilizes the servo information is referred to as servo control.

In order to prevent the slider of a magnetic disk drive from sticking to and generating stiction on the surface of a magnetic disk whose rotation has stopped, a magnetic head needs to be unloaded from the recording surface of the magnetic disk while the rotation of the disk is in the stopped state. A load/unload system that utilizes a ramp member disposed near the outer marginal edge of the magnetic disk is employed as one such unloading technique. In the load/unload system, while a lift tab protruding from the leading end of the actuator assembly is in engagement with the sliding surface of the ramp member, the actuator assembly rotationally moves to its home position at which the magnetic head finally stops during unloading.

Also, some magnetic disk drives employs a magnetic latch scheme in which the actuator assembly is magnetically attracted at and fixed to its home position by a strong magnet to prevent the magnetic head from moving to a position above the magnetic disk if an external shock or vibration is applied to the magnetic disk drive with the unloaded magnetic head remaining on the ramp member. The magnetic latch scheme, compared with an inertial latch scheme, is simple in construction and has the advantage that the magnetic disk drive can be manufactured inexpensively. Therefore, the magnetic latch scheme is most commonly used in magnetic disk drives designed for general consumer products, in particular.

While the magnetic head of the magnetic disk drive is flying above the magnetic disk, the operation of the actuator assembly can be servo-controlled by reading written servo data from the magnetic disk and calculating the position and the moving speed of the magnetic head. However, the magnetic head cannot read servo data while the lift tab is moving along the sliding surface of the ramp member (hereinafter, this state is called the load/unload state). In the load/unload state, the voice coil mounted on the actuator assembly controls the rotating speed of the actuator assembly to a constant speed by utilizing the back electromotive force occurring in the voice coil when the coil moves within the magnetic flux space. The back electromotive force, since it is proportional to the moving speed of the voice coil, is hereinafter referred to as the speed electromotive force.

For the magnet latch type of magnetic disk drive, since the actuator assembly undergoes the strong attraction force of the magnet in the load/unload state, the actuator assembly needs to be released from the latch magnet or speed-controlled in defiance of the attraction force. This is why a large current is supplied to the voice coil to give a strong torque thereto. A VCM driver supplies the current of a desired value to the voice coil by conducting current switching control to regulate the torque to be applied to the voice coil. In recent years, more silent operation of the magnetic disk drives in products such as the HDD recorders used in living rooms, is being increasingly demanded, which poses the problem of noise from these magnetic disk drives due to VCM driver switching operation.

Japanese Laid-Open Patent No. 2000-123502 ("Patent Document 1") discloses a hard-disk drive in which a transducer moves transversely above the surface of a disk in such a way as to form a sine-wave acceleration path. It is described in Patent Document 1 that acoustic noise from a head gimbal assembly is minimized by reducing the higher-harmonic components of rectangular waves using the sine-wave acceleration path. Japanese Laid-Open Patent No. 2001-43645 ("Patent Document 2") discloses a technique for detecting and controlling the back electromotive force occurring in a VCM. This latter technique uses the detection and control of the back electromotive force within the VCM because, during loading/unloading control of a head, since the head moves along the surface of a ramp while staying away from a disk, servo information present on the disk is neither detectable nor controllable by using normal servo control with the head.

BRIEF SUMMARY OF THE INVENTION

Embodiments in accordance with the present invention provide a magnetic disk drive with sufficiently low noise. As shown in the particular embodiment of FIG. 3, a digital/analog converter supplies to a VCM driver a control voltage Vdac comprising a first preset voltage value VI, a second preset voltage value V3, and a transition voltage value V2 of a substantially cosine wave that interconnects the first preset voltage value V1 and the second preset voltage value V3. A driving current is supplied from the VCM driver to a voice coil of an actuator assembly. Since a current not containing higher-harmonic components in transition period P2 flows as a VCM current Ivcm that flows into the voice coil, vibromotive force can be easily suppressed by shifting a structural resonance point of the entire disk drive including the actuator assembly. In addition, since the back electromotive force VL occurring in an inductance element is cleared to zero during a half wavelength of period of the cosine wave, speed electromotive force can be measured by immediate shifting from a setting period to a measuring period.

BRIEF DESCRIPTION OF THE DRAWINGS

FIGS. 9(A) and 9(B) are diagrams that show a comparison between acceleration of loading at a conventional VCM control voltage Vdac and acceleration of loading at a VCM control voltage Vdac according to embodiments of the present invention.

FIG. 10 is a diagram that shows a comparison between a sound pressure in the case of loading at the conventional VCM control voltage Vdac and a sound pressure in the case of loading at the VCM control voltage Vdac according to embodiments of the present invention.

DETAILED DESCRIPTION OF THE INVENTION

Embodiments in accordance with the present invention relate generally to techniques for controlling an actuator assembly built into a magnetic disk drive, and more particularly, to a technique for reducing the noise and vibration occurring when the actuator assembly operates.

Figure 1A:
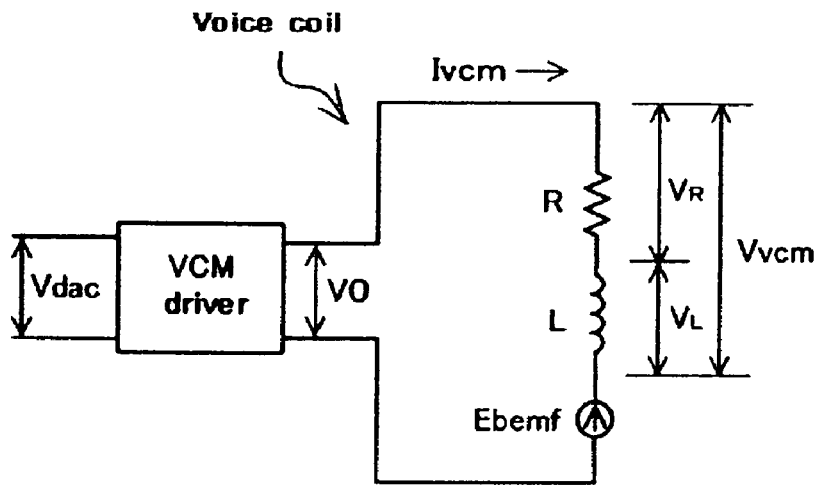
FIG. 1(A) is a diagram showing an equivalent circuit of a voice coil
Figure 1B:
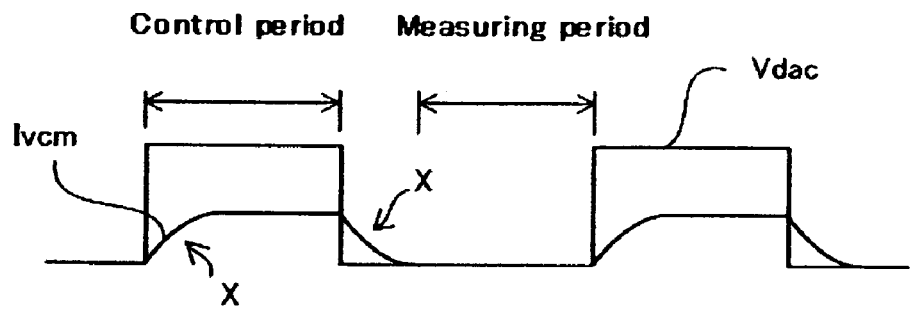
FIGS. 1(B)-1(D) show the voltage waveform and current waveform occurring in the equivalent circuit under a conventional switching control scheme.
Figure 1C:
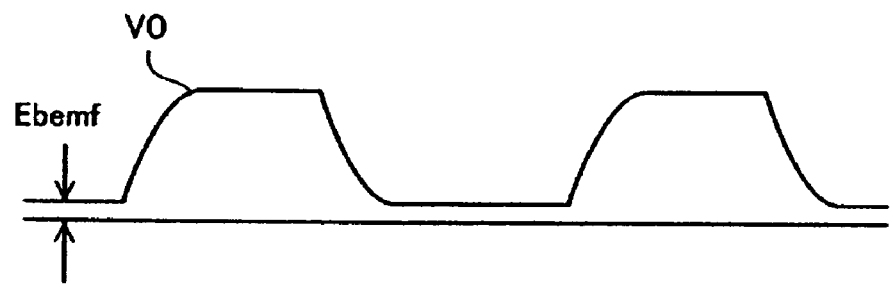
Figure 1D:
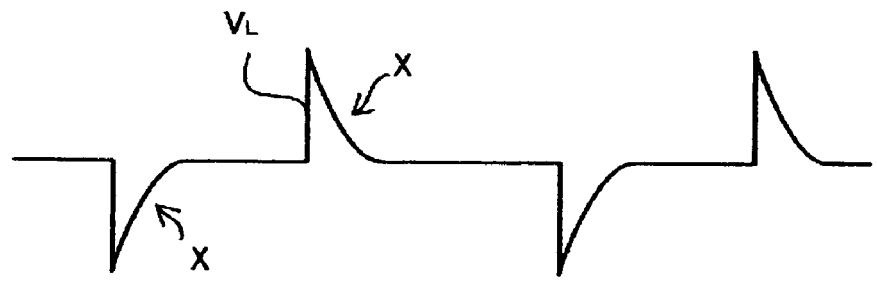

FIG. 1(A) shows an equivalent circuit of a voice coil; FIGS. 1(B) to 1(D) show a voltage waveform and current waveform occurring in the equivalent circuit under a conventional switching control scheme. FIG. 1(A) shows a state in which a current is supplied from a VCM driver to the voice coil that is moving at a constant speed inside the magnetic flux space generated by a VCM magnet. When an analog VCM control voltage Vdac is supplied to the VCM driver, this driver generates a VCM current Ivcm associated with the VCM control voltage Vdac, and supplies the VCM current Ivcm to the voice coil.

Since the voice coil is equivalent to a circuit comprising electrically series-connected resistor R and inductance element L, when the VCM current Ivcm flows into this circuit, back electromotive force VR is developed at resistor R and back electromotive force VL is developed at inductance element K. The total of the back electromotive force VR and the back electromotive force VL is hereinafter referred to as VCM voltage Vvcm. The VCM voltage Vvcm is the voltage needed to supply the VCM current Ivcm of a required level to the voice coil and assign a required torque thereto. In addition, when the voice coil moves within the magnetic flux space, speed electromotive force Ebemf occurs, pursuant to the Fleming's right-hand rule, and a coil end voltage VO, the resultant of the VCM voltage Vvcm and the speed electromotive force Ebemf is developed at the output end of the VCM driver.

The electromotive force Ebemf is the electromotive force of a direct current that is proportional to the moving speed of the voice coil, and the direction of the electromotive force differs according to the particular moving direction of the voice coil. FIG. 1(B) shows a state in which the VCM current Ivcm determined by the resistance R, the inductance L, and the speed electromotive force Ebemf, is flowing through the voice coil with the VCM control voltage Vdac input to the VCM driver. All horizontal axes in FIGS. 1(B) to 1(D) are time bases. In FIG. 1(B), when a step voltage is applied to the voice coil of the series circuit comprising the resistor R and the inductance element L, a time lag is caused to the VCM current Ivcm at the rising and falling edges of the corresponding signal, as marked with reference code X.

At the positions marked with reference code X, the VCM current Ivcm is increased and attenuated exponentially with Napier's constant "e" as a base. As will be made obvious through Fourier development, the VCM currents Ivcm at the X-marked positions contain higher-harmonic currents of various orders of magnitude. The VCM magnet generates torques of plural frequencies with respect to the higher-harmonic currents, and these torques becoming a vibromotive source for the actuator because of the vibration and noise of the magnetic disk drive.

FIG. 1(C) shows the coil end voltage VO that is the total of the VCM voltage Vvcm and the speed electromotive force Ebemf. Although FIG. 1(C) indicates that the speed electromotive force Ebemf is developed in the same direction as that of the VCM voltage Vvcm, if the speed electromotive force Ebemf is developed in the direction opposite to that of the VCM voltage Vvcm, the coil end voltage VO equals the difference between the VCM voltage Vvcm and the speed electromotive force Ebemf. Of all VCM voltages Vvcm, only the back electromotive force VL occurring in the inductance element L is shown in FIG. 1(D). In FIG. 1(D), the back electromotive force VL that has occurred in the inductance element L is increased or attenuated exponentially with Napier's constant "e" as a base, as marked with reference code X.

Figure 2:
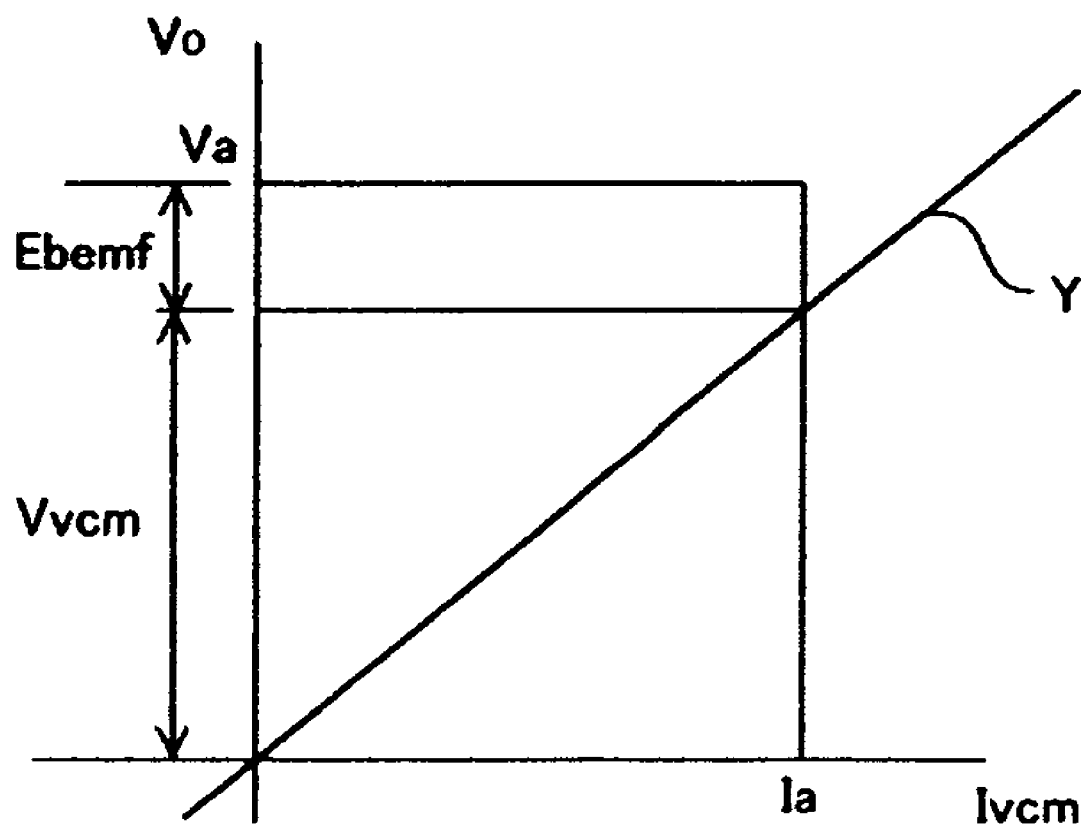
FIG. 2 is a diagram explaining a method of measuring speed electromotive force Ebemf when a VCM current Ivcm in a loading/unloading state is not too large.

In the load/unload state of the actuator assembly, while the lift tab is in engagement with the ramp mechanism, since the magnetic head cannot read servo data from the magnetic disk, the speed electromotive force Ebemf not depending on servo information is utilized to conduct constant-speed control for constant rotating speed of the actuator. The speed electromotive force Ebemf can be detected as the coil end voltage VO of the voice coil by providing a voltage detection circuit in the VCM driver. FIG. 2 is a diagram that explains a method of measuring the speed electromotive force Ebemf when loading/unloading is possible even without increasing the VCM current Ivcm too much, as with a magnetic disk drive using an inertial latch.

As shown in FIG. 1(A), the coil end voltage VO that can be detected at the output end of the VCM driver is the total of the VCM voltage Vvcm and the speed electromotive force Ebemf. The characteristics Y representing the relationship between the VCM current Ivcm and the VCM voltage Vvcm can therefore be derived by measuring the coil end voltage VO after clearing the speed electromotive force Ebemf to zero by stopping the operation of the voice coil. After the characteristics Y is stored as data into the ROM of the magnetic disk drive, when the required VCM current Ivcm is detected during actual control and the coil end voltage VO is measured as Va, the speed electromotive force Ebemf can be calculated by subtracting from the coil end voltage VO the VCM voltage Vvcm appropriate for the VCM current Ia derived from the characteristics Y.

In the magnet latch type of a magnetic disk drive, however, since the actuator assembly needs to be driven in defiance of the attraction force of the latch magnet, the VCM current Ivcm in the load/unload state is increased very significantly. In addition, when the actuator assembly is released from the attraction of the latch magnet, the VCM current Ivcm becomes its maximum and since the rotating speed of the actuator assembly is low, the speed electromotive force Ebemf is reduced. It becomes difficult, therefore, to detect the speed electromotive force Ebemf from the coil end voltage VO by utilizing the characteristics curve Y shown in FIG. 2. Furthermore, the characteristics Y requires frequent calibration since the characteristics Y change according to time-varying factors of the magnetic disk drive and temperature conditions.

For the magnet latch type of magnetic disk drive, therefore, a definite turn on/off time interval of the VCM current Ivcm in the load/unload state is divided into a control period during which the VCM control voltage Vdac is applied to the VCM driver, and a measuring period during which the coil end voltage VO is cleared to zero, as shown in FIG. 1(B). The speed electromotive force Ebemf is measured within the measuring period. For accurate measurement of the speed electromotive force Ebemf, it is desirable that within the measuring period, the VCM voltage Vvcm not be included in the coil end voltage VO.

As shown in FIG. 1(D), however, the back electromotive force VL that has occurred in the inductance element L remains in the coil end voltage VO for a fixed time, even after the control period has finished. Additionally, the back electromotive force VL causes the VCM current Ivcm to flow and thus the back electromotive force VR is developed at the resistor R as well and superimposed on the speed electromotive force Ebemf. Even when the control period is completed, therefore, measurement of the speed electromotive force Ebemf cannot be started immediately. It takes a relatively long time for the back electromotive force VL, which attenuates in accordance with the exponential function having a Napier's constant "e" as its base, to decrease to a level at which the speed electromotive force Ebemf can be accurately measured. In addition, since the particular time required changes according to the particular magnitude of the immediately preceding VCM current Ivcm, the longest possible time or the time derived by performing complex calculations according to the particular VCM current Ivcm must be adopted as an attenuation period to set up the measuring period.

In general, the electromotive force Ebemf is sampled five or six times during its measuring period and an average value of these samplings is adopted as Ebemf. A required time is therefore necessary as the length of the measuring period. If a fixed time is reserved as the length of the measuring period and the cycle time of the measuring period is set to stay within a required range, the particular back electromotive force VL at the inductance element L will not allow a sufficient control period to be reserved. Conversely, if a sufficient control period is reserved, the measuring period will be too short or the cycle time of the measuring period will be too long. These states will cause the problem that when constant-speed control of the actuator is conducted for loading/unloading, it takes a long time for the actuator to arrive at a target speed.

Embodiments in accordance with the present invention, therefore, provide a magnetic disk drive reduced in noise level. Another object of embodiments in accordance with the present invention is to provide a magnetic disk drive excellent in actuator control characteristics based on speed electromotive force. Yet another object of embodiments in accordance with the present invention is to provide an actuator-driving system reduced in causes of vibration and noise. A further object of embodiments in accordance with the present invention is to provide a loading/unloading method that makes a target speed attainable within a minimum time while at the same time reducing noise.

Embodiments of the present invention are characterized in that during operation, when a current to be supplied to a voice coil including an inductance component undergoes switching control, a first preset voltage value and a second preset voltage value are connected to each other by a transition voltage value of a substantially cosine wave during a period of transition from the first preset voltage value to the second preset voltage value. If a step-like voltage is applied to the voice coil, a higher-harmonic current flows into the voice coil, resulting in vibration and/or noise. Adopting the transition voltage value of a substantially cosine wave, however, makes it possible to suppress vibration and noise by supplying a current of a single frequency, not inclusive of higher-harmonic components, to the voice coil. In addition, since the back electromotive force occurring in the inductance element can be cleared to zero within a time equivalent to a half wavelength of a cosine wave, speed electromotive force can be measured immediately after the transition period has passed.

The substantially cosine wave here means that the cosine wave is allowed to contain errors associated with signal quantizing and sampling when a theoretical cosine wave is created using digital data. Any higher-harmonic current components contained in the voice coil can be minimized by selecting a waveform of a half cycle of a 0 to $\pi$ or $\pi$ to $2\pi$ such that the transition voltage value has its time-differentiated values zeroed at boundaries of the transition voltage value with respect to the preset first and second voltage values. A preferred transition voltage value is a value obtained by adding an amplitude value as direct-current components to a cosine wave having this amplitude value as a value half the difference between the first preset voltage value and the second preset voltage value.

A control voltage that incorporates the transition voltage value to be applied to the voice coil can be adopted for various switching control schemes in which a preset voltage value is to be controlled with PWM driving, PFM driving, or the like. If data for creating the transition voltage value is stored as a cosine-wave table into a nonvolatile memory, a processor can calculate the necessary transition voltage value with amplitude as a parameter and interconnect any preset voltages. During the measuring period in which the total back electromotive force occurring in a resistor of the voice coil and in the inductance element thereof is cleared to zero, the processor measures the coil end voltage and recognizes the measured value as speed electromotive force.

The actuator assembly control scheme that uses the transition voltage value is particularly advantageous for using speed electromotive force to conduct constant-speed control, instead of servo control for purposes such as loading onto and unloading from a ramp mechanism. For a magnetic disk drive with a magnet latch, preferable control characteristics can be obtained since a transition from the control period to the measuring period can be immediately conducted. The transition voltage value may be used only under a load/unload state. The transition voltage value may also be used under a servo control state.

For the above reasons, embodiments of the present invention make it possible to provide a magnetic disk drive reduced in noise level. Embodiments of the present invention also make it possible to provide a magnetic disk drive excellent in actuator control characteristics based on speed electromotive force. In addition, the embodiments of the present invention make it possible to provide an actuator-driving system reduced in causes of vibration and noise. Furthermore, the embodiments of the present invention make it possible to provide a loading/unloading method that makes a target speed attainable within a minimum time while at the same time reducing noise.

Figure 3A:
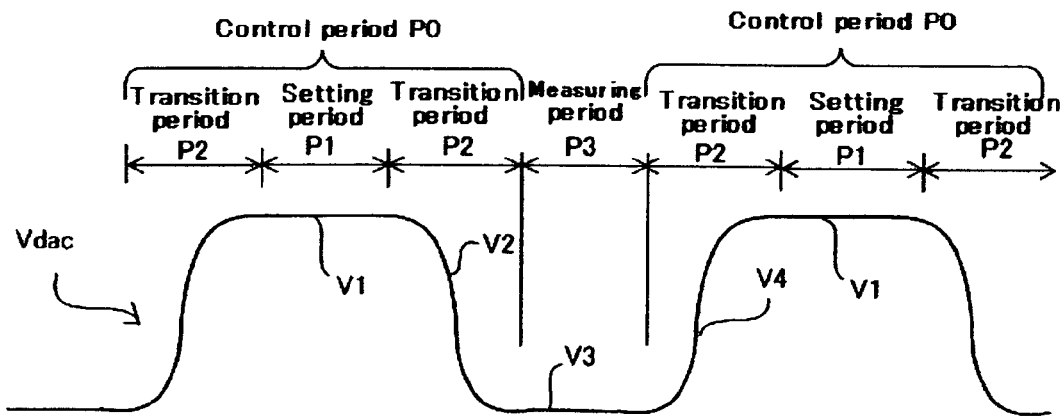
FIGS. 3(A)-3(C) are diagrams explaining a waveform of a VCM control voltage Vdac according to an embodiment of the present invention.

FIG. 3 is a diagram explaining a waveform of an analog VCM control voltage Vdac according to an embodiment of the present invention. An equivalent circuit of a voice coil is the same as described using FIG. 1(A). In FIG. 3(A), a time base of the analog VCM control voltage Vdac is split into a control period P0 and a measuring period P3. The control period P0 consists of a setting period P1 and two transition periods P2 arranged on both sides of P1. During the setting period P1, the VCM control voltage Vdac is set as a preset voltage value V1.

Figure 4:
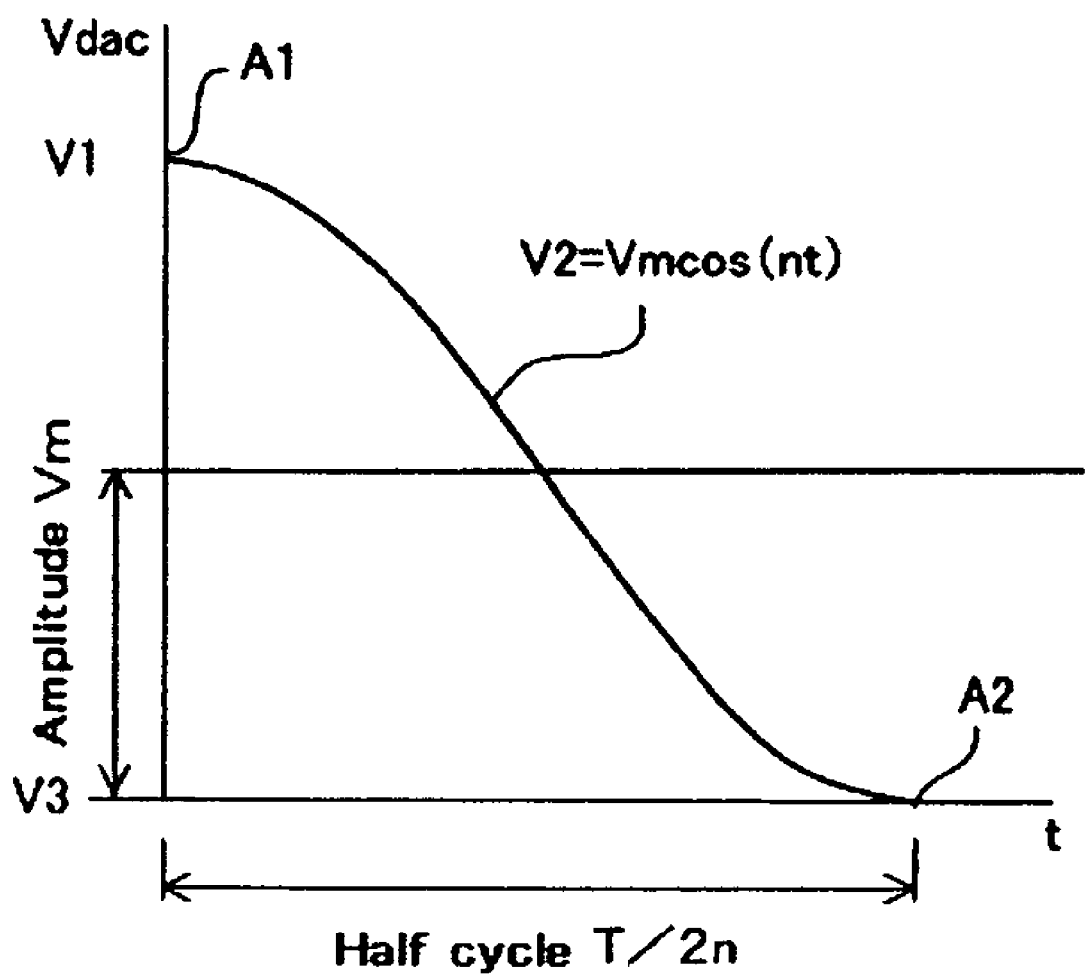
FIG. 4 is a diagram explaining a transition voltage value V2.

During the measuring period P3, the VCM control voltage Vdac is set as a preset voltage value V3. Although the preset voltage value during the measuring period is zero in FIG. 3(A), the scope of the present invention covers a case in which the preset voltage value V3 is any other preset voltage value assigned during the control period, not the measuring period, this preset voltage value being a plus or minus value other than zero. Also, the VCM control voltage Vdac during the transition period P2 present between the setting period P1 and the measuring period P3 is assigned as a transition voltage value V2. As shown in detail in FIG. 4, the transition voltage value V2 exhibits a waveform of a half cycle of T/2n (T is a cycle for n =1) within a range of nt =0 to nt =π of a cosine wave of V2 =Vmcos (nt).

The transition voltage value V2 is set to be equal to ½ of a difference between the preset voltage values V1 and V2 in terms of amplitude Vm of the cosine wave, and direct-current components equivalent to the amplitude Vm are synthesized. This connects a starting point A1 to the preset voltage value V1 and an ending point A2 to the preset voltage value V3. Time-differentiated values of the transition voltage value V2 at the starting point A1 and ending point A2 become zero, but embodiments of the present invention are also characterized in that it utilizes such a feature of the cosine wave. In FIG. 3(A), a transition voltage value V4 within the transition period P2 during which a transition from the preset voltage value V3 to the preset voltage value V1 is conducted exhibits a waveform of a half cycle of T/2n within a range of nt =π to nt =2π of the cosine wave of V2 =Vmcos (nt). As with the transition voltage value V2, the transition voltage value V4 is set to be equal to ½ of a difference between the preset voltage values V1 and V3 in terms of amplitude Vm of the cosine wave, and direct-current components equivalent to the amplitude Vm are synthesized. This connects the starting point to the preset voltage value V3 and the ending point to the preset voltage value V1.

Figure 3B:
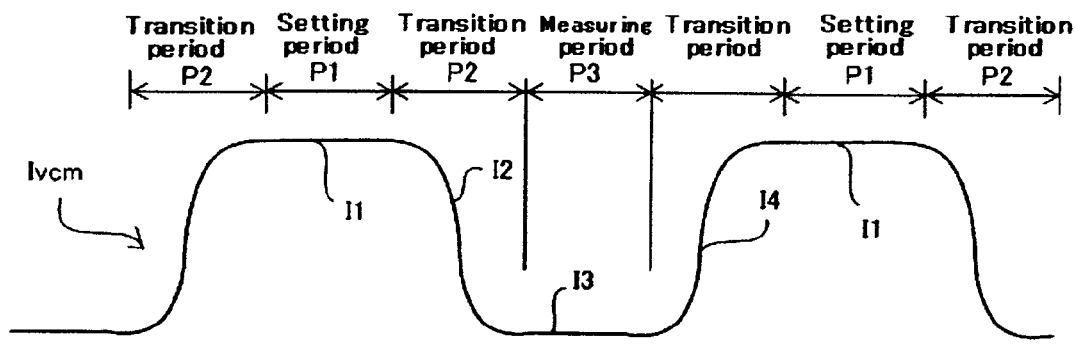

The transition period P2 can be regulated by selecting "n" of the cosine wave of V2=Vmcos (nt). For example, if n=2, one cycle is half a cycle T associated with n=1, so the transition period of time from starting point A1 to ending point A2 can be halved. In the present embodiment, although "n" in the transition voltage value V2 and that of the transition voltage V4 are made equal to each other, different values can be selected instead. During this transition period P2, when the VCM control voltage Vdac having the transition voltages V2 and V4 is supplied to a VCM driver, a waveform of a VCM current Ivcm which flows into the voice coil will be as shown in FIG. 3(B). Unlike that of FIG. 1(B), the VCM current Ivcm in FIG. 3(B) changes to a current value I2 of the cosine wave during the transition period P2 from a current value I1 of the setting period P2 to a current value I3 of the measuring period P3. Time-differentiated values of the VCM current Ivcm become zero at the transition positions from the current value I1 to the current value I2 and from the current value I2 to the current value I3. A VCM current I4 that flows during a transition from the measuring period P3 to the setting period P1 also forms a cosine wave.

The current that flows during the transition period forms a cosine wave, which is not contained in higher-harmonics. Since a torque acting as vibration on the voice coil becomes a component of a single frequency, the vibration can be easily suppressed by shifting a resonance point of a mechanical system of a magnetic disk drive. In conventional magnetic disk drives, vibration and/or noise has occurred each time switching control operation is performed by a change of a preset VCM control voltage value Vdac, and a current of multiple frequency components has flown into respective voice coils. It has therefore been difficult to suppress vibration and noise by using associated conventional techniques. This problem, however, is solved according to embodiments of the present invention.

Figure 3C:
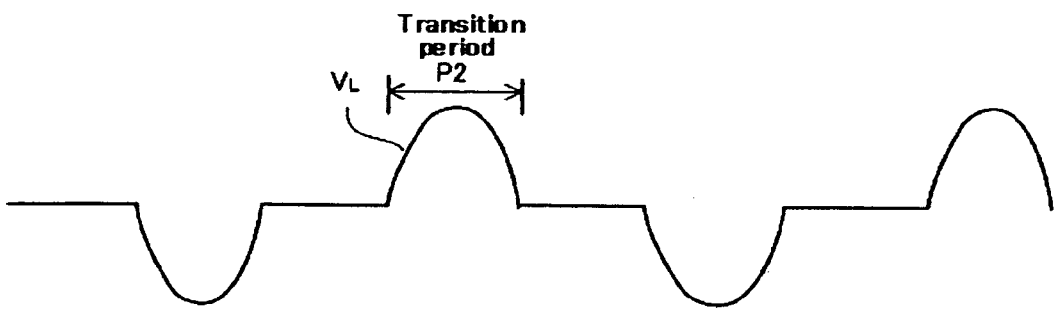

FIG. 3(C) shows a waveform of the back electromotive force VL occurring in an inductance element L. An absolute value of the back electromotive force VL occurring in an inductance element L can be derived as a product of an inductance value of the inductance element L and a time-differentiated value of a current which flows through the inductance element L. Since the value I2 of the current flowing into the voice coil signifies a cosine wave, time-differentiating this current yields a sine wave. Back electromotive force VL of a sine wave creates a voltage value of zero at both starting point and ending point of an associated transition period P2, so that a long time is not spent until the current has attenuated as in FIG. 1(D).

For these reasons, it is possible to start the measuring period P3 early in comparison with that of FIG. 1(A), and consequently to increase a rate of the control period P1 relative to the measuring point P2. During constant-speed control of an actuator, therefore, a target speed can be reached within a short time. Any value can be selected as the transition period P2 by changing the cycle of the cosine wave. During the control periods P0, only one voltage value is shown in FIG. 3. During actual operation, however, such multiple preset voltage values as shown in FIG. 5, can be assigned so as to appear before a transition to the measuring period occurs.

Figure 5A:
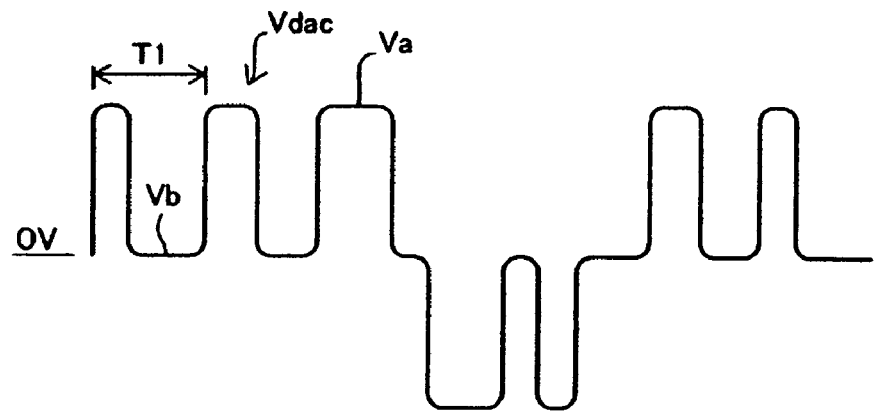
FIGS. 5(A)-5(C) are diagrams that show examples of a VCM control voltage Vdac which employs a cosine wave in transition periods.
Figure 5B:
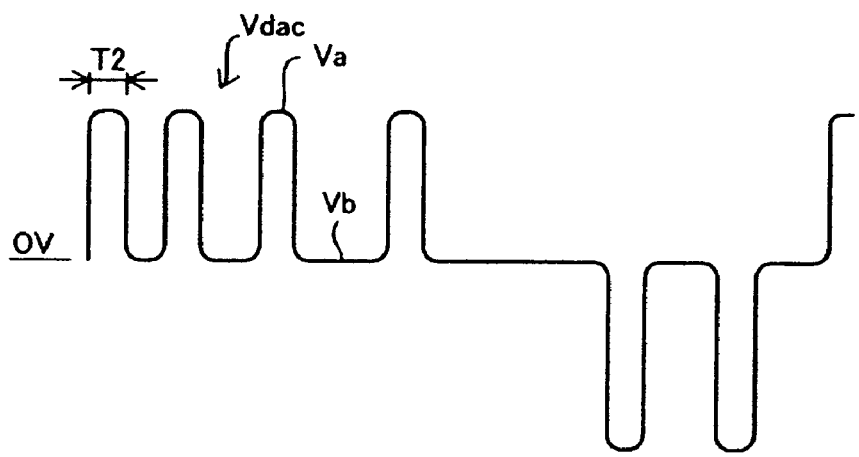
Figure 5C:
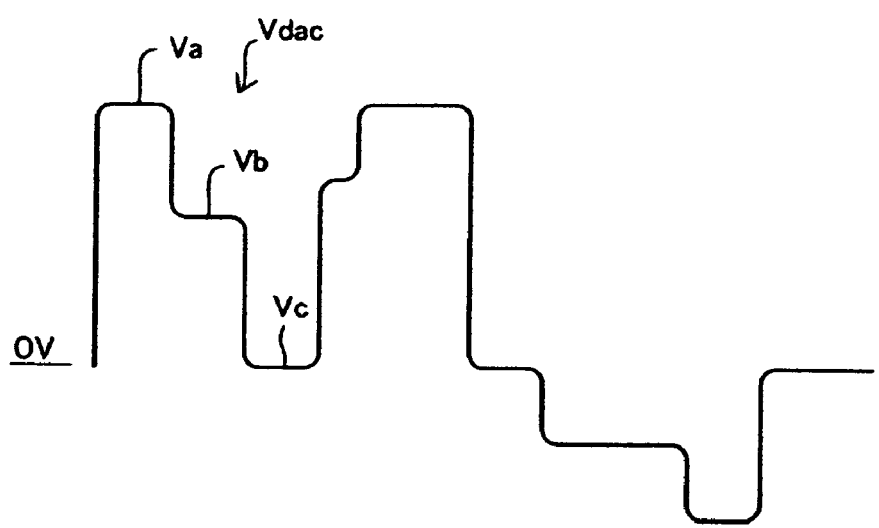

FIG. 5 shows examples of a VCM control voltage Vdac which employs a cosine wave in transition periods. The VCM control voltage Vdac including the transition voltage values V2 and V4, described using FIG. 3, is not limited to the use only for loading/unloading an actuator assembly. The VCM control voltage Vdac in FIG. 3 can also be used for servo control to make the actuator perform a seek operation and/or a follow-up operation while a magnetic head is reading servo data. FIG. 5(A) shows an example of applying the VCM control voltage Vdac to the PWM scheme of voltage control that changes a turn-on period at a constant cycle time T1. A cosine wave of a half cycle interconnects voltage values Va and Vb (0 V). FIG. 5(B) shows an example of applying the VCM control voltage Vdac to the PFM scheme of voltage control that changes a frequency at a constant turn-on period T2. FIG. 5(C) shows an example in which a plurality of plus or minus preset voltage values exist and are interconnected by a cosine wave of a half cycle. In FIG. 5(C), cosine waves of a half cycle time appear during transition periods from a preset voltage value Va to a present voltage value Vb and from the preset voltage value Vb to a present voltage value Vc (0 V).

Figure 6:
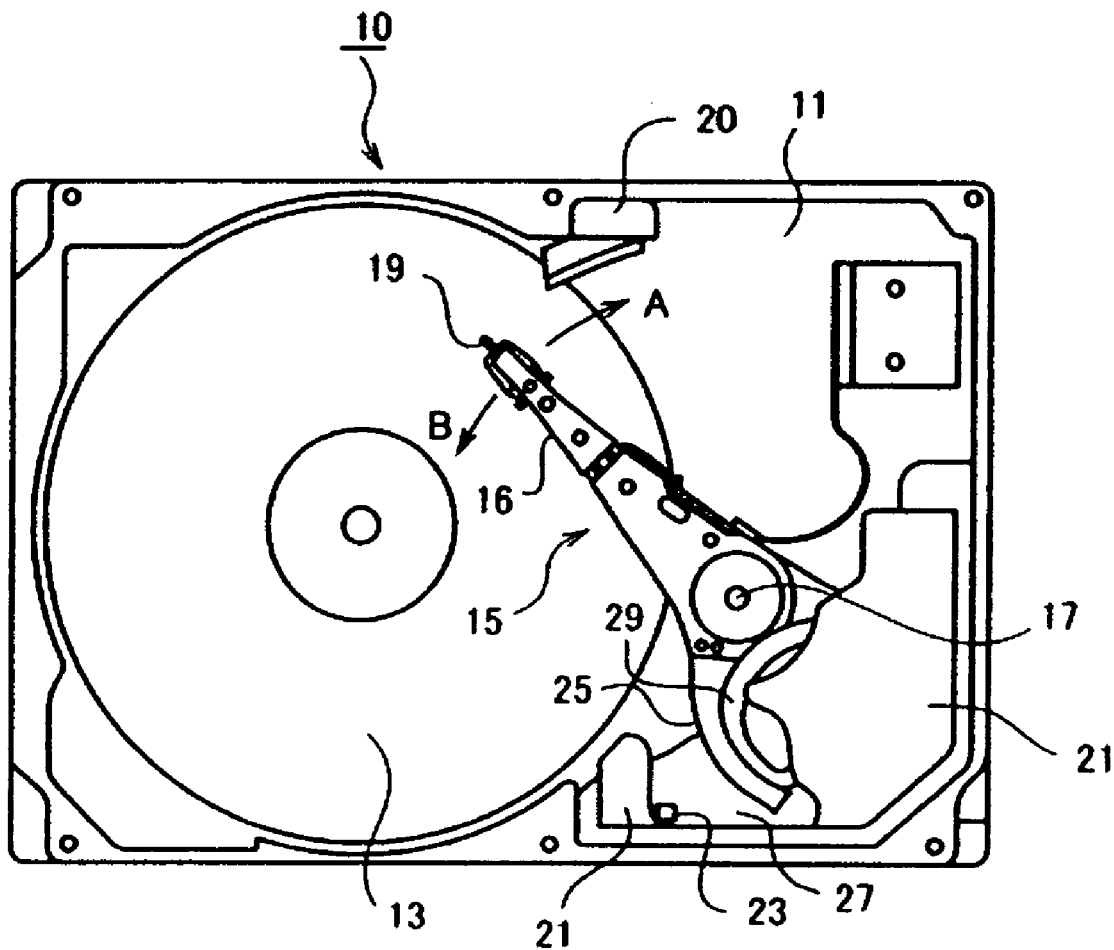
FIG. 6 is a plan view of a magnetic disk drive 10 according to embodiments of the present invention.

FIG. 6 is a plan view of the magnetic disk drive 10 according to the present embodiment. A magnetic disk 13, an actuator assembly 15, a ramp mechanism 20, a VCM magnet 21, a VCM yoke 27, and a latch magnet 23 are mounted on a base 11. The magnetic disk 13 fixed to a hub of a spindle motor provided at a lower section of the disk is constructed to be rotatable. On the surface of the magnetic disk 13, a plurality of sets of servo data are written radially in a radial direction of the disk. When a magnetic head reads one of the plural sets of servo data, an MPU can recognize a position of the magnetic head.

One set of servo data consists of track identification data and a burst pattern. The track identification data is information that identifies a track address of a specific data track. The MPU can recognize a current position of the magnetic head from the track identification data read by the magnetic head. The burst pattern consists of a plurality of signal storage regions different from one another in phase. A shift in position of the magnetic head from a servo track can be judged from a signal output from the burst pattern.

The actuator assembly 15 includes a head suspension assembly (HSA) 16, a coil holder 25, and a voice coil 29. In order to illustrate the coil holder 25 and the voice coil 29 in exposed form, part of the VCM magnet 21 is not shown in FIG. 6. As a matter of fact, however, the VCM magnet 21 is provided in such a form as to shroud the entire voice coil 29. The VCM yoke 27 is provided at a lower section of the VCM magnet 21, and a magnetic flux space is formed between the VCM magnet 21 and the VCM yoke 27. The voice coil 29, the VCM magnet 21, and the VCM yoke 27 constitute a VCM. Supplying a current to the voice coil 29 located in the magnetic flux space rotates the actuator assembly 15 in a direction of arrow A or B with a pivoting shaft 17 as a center. As the actuator assembly 15 rotates in the direction of arrow A, a lift tab 19 formed at a leading edge of the HSA 16 glides along a sliding surface of the ramp mechanism 20 and the actuator assembly 15 stops at a home position thereof. This operation sequence is referred to as unloading.

After the lift tab 19 has glided onto the sliding surface of the ramp mechanism 20, the magnet head cannot read any servo data from the magnetic disk, so the MPU recognizes a rotating speed of the actuator assembly by detecting the speed electromotive force occurring in the voice coil 29. At the home position of the actuator assembly 15, the coil holder 25 thereof is magnetically attracted to the latch magnet 23. The latch magnet 23 has a magnetic force strong enough to prevent the actuator assembly 15 at the home position from being easily released therefrom, even if a shock or vibration is applied from outside. Unloading is conducted before a rotating movement of the magnetic disk 13 is stopped by issuance of an external command or the occurrence of an internal event.

An operation conducted for the actuator assembly 15 at the home position to move in the direction of arrow B from the ram mechanism 20 after the magnetic disk 13 has rotated is referred to as loading. When the actuator assembly 15 is loaded, a large current flows into the voice coil 29 since the VCM needs to cause the voice coil 29 to generate a torque exceeding an attraction force of the latch magnet 23.

Figure 7:
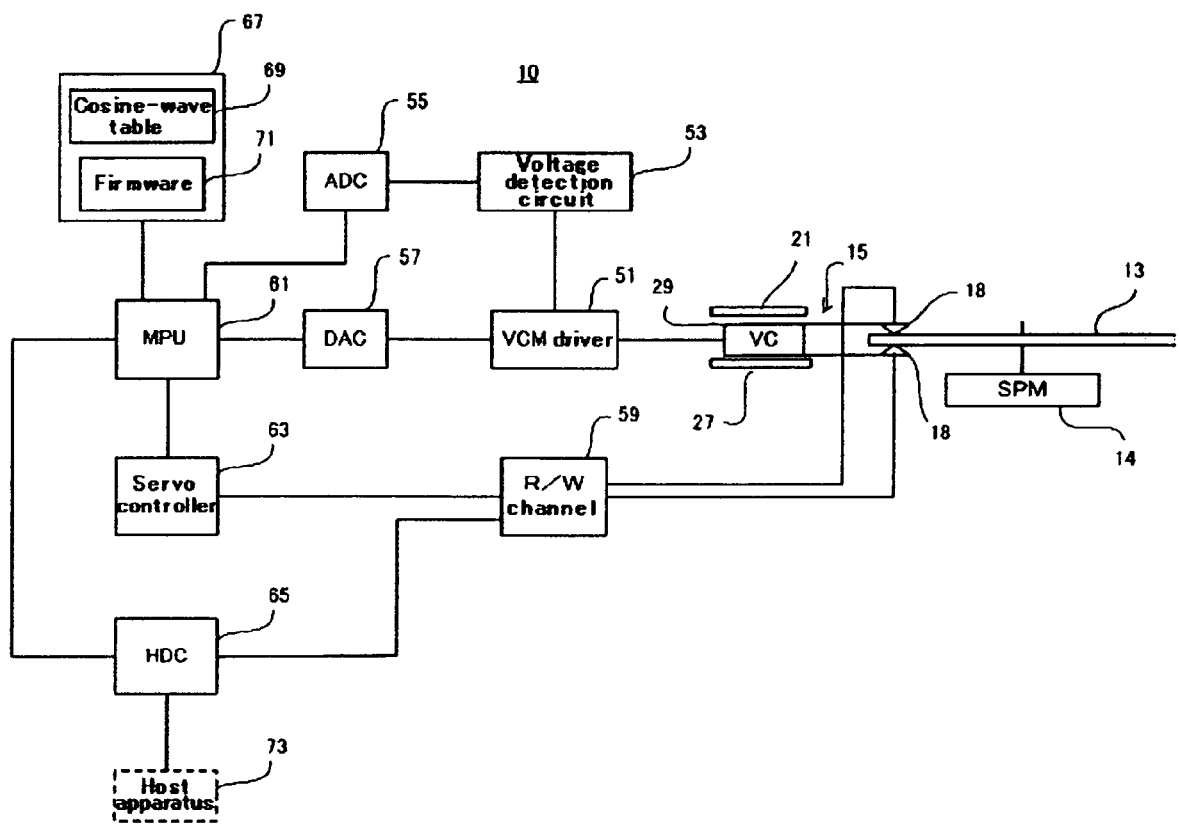
FIG. 7 is a schematic block diagram of the magnetic disk drive.

A block diagram of the magnetic disk drive 10 is shown in FIG. 7. In FIG. 7, the same reference number is assigned to the same constituent element as in FIG. 6, and description of these elements is omitted. Although omitted in FIG. 6, a spindle motor 14 that rotates the magnetic disk 13, and magnetic heads 18 are shown in FIG. 7. Two magnetic heads 18, one on the surface of the magnetic disk 13 and one on the reverse side thereof, are retained at leading edges of respective HSAs 16. Each magnetic head 18 performs data read/write operations on the magnetic disk 13 by using magnetic signals. The magnetic head 18 also reads written servo data from the magnetic disk 13. The magnetic head 18, together with the actuator assembly 15, moves in the radial direction of the magnetic disk 13.

A read/write channel 59 executes user data read and write processes. More specifically, the read/write channel 59 converts the digital data that has been transferred from a host apparatus 73 via a hard-disk controller (HDC) 65, into a writing current and then supplies the current to the magnetic head 18. The magnetic head 18 writes the data onto the magnetic disk 13 in accordance with the writing current. The read/write channel 59 also converts a reading current that has been read out from the magnetic disk 13, into digital data form and then outputs the digital data to the host apparatus 73 via the HDC 65. Servo information is included in the digital data that the read/write channel 59 creates. A servo controller 63 extracts the servo information from the readout data which is output from the read/write channel 59. As set forth earlier in the description of FIG. 6, the servo information contains track identification data and a burst pattern. The servo controller 63 transfers the extracted servo information to an MPU 61.

The HDC 65 has interface functions with respect to the magnetic disk drive 10. One of the functions is to receive the write data that has been transferred from the host apparatus 73, and transfer the data to the read/write channel 59. The HDC 65 also transfers readout data from the read/write channel 59 to the host apparatus 73. In addition, the HDC 65 receives commands and control information from the host apparatus 73 and transfers the commands and the control information to the MPU 61. A digital/analog converter (DAC) 57 converts a digital DAC input value that has been output from the MPU 61, into an analog VCM control voltage value Vvcm and outputs the VCM control voltage value to a VCM driver 51. The VCM driver 51 converts the VCM control voltage value Vvcm that has been received from the DAC 57, into a driving current of the VCM and then supplies the current to the voice coil 29. A voltage detection circuit 53 detects a coil end voltage VO developed at an output end of the VCM driver 51, and sends the voltage to an analog/digital converter (ADC) 55. The voltage detection circuit 53 can also be built into the VCM driver 51. The ADC 55 sends to the MPU 61 the coil end voltage value VO that has been converted into digital data.

The MPU 61 controls various processes such as data communications with the host apparatus 73, the operation of the actuator assembly 15, and data read/write operations on the magnetic disk. The MPU 61 executes firmware 71 stored within a ROM 67. The MPU 61 also executes the firmware 71 to conduct the loading/unloading method according to embodiments of the present invention, and an algorithm for creating the DAC input data that contains transition voltage values. The MPU 61 judges the position of the magnetic head 18 in accordance with the servo information that has been transferred from the servo controller 63. Additionally, in accordance with a deviation between a current position of the magnetic head 18 and a target position, the MPU 61 calculates the DAC input data intended for speed control of the magnetic head 18, and outputs the DAC input data to DAC 57. Appropriate DAC input data is output from the MPU 61 each time a set of servo data is read out by the magnetic head 18.

The ROM 67 internally has a cosine-wave table 69 that is a data table indicating the waveforms of cosine waves. The cosine-wave table 69 contains one cycle time of cosine-wave data in which a half cycle $T/2\pi$ has been matched to the transition period P2 of FIG. 3. The MPU 61 uses the cosine-wave table 69 to calculate amplitude Vm from the difference between the preset voltage value V1 existing before a transition, and the preset voltage value V3 existing after the transition. The MPU 61 can thus create digital data of the transition voltage value V2 to conduct the transition between the preset voltage values V1 and V3 by using an associated cosine wave. The MPU 61 creates appropriate digital data for the transition voltage value V2 in FIG. 3. This is performed using a range of $nt=0$ to $\pi$ of the cosine wave if the preset voltage value V1 mentioned above is greater than the preset voltage value V3, or using a range of $nt=\pi$ to $2\pi$ of the cosine wave if the preset voltage value V1 is smaller than the preset voltage value V3. The DAC 57 creates the DAC input data for generating the VCM control voltage Vdac constructed of such preset voltage values V1, V3, and transition voltage value V2 that are shown in FIG. 3(A).

Since the cosine-wave table 69 consists of digital data, although errors in signal quantizing and sampling cause mismatching to a theoretical cosine wave, the data in the cosine-wave table is constructed as data approximate to the theoretical cosine wave. Even if the data mismatches the theoretical cosine wave, therefore, the data is included in a cosine wave according to embodiments of the present invention. When the voice coil 29 moves in the magnetic flux space, speed electromotive force Ebemf occurs that is proportional to the moving speed of the voice coil. The MPU 61 recognizes as the speed electromotive force Ebemf the coil end voltage VO that has been detected during the measuring period P3 of FIG. 3 by the ADC 55 and then sent therefrom. When the magnetic head 18 is in the state that it cannot read servo data, the MPU 61 calculates the rotating speed of the actuator assembly 15 from the speed electromotive force Ebemf and determines the DAC input data to be supplied to the DAC 57.

Figure 8:
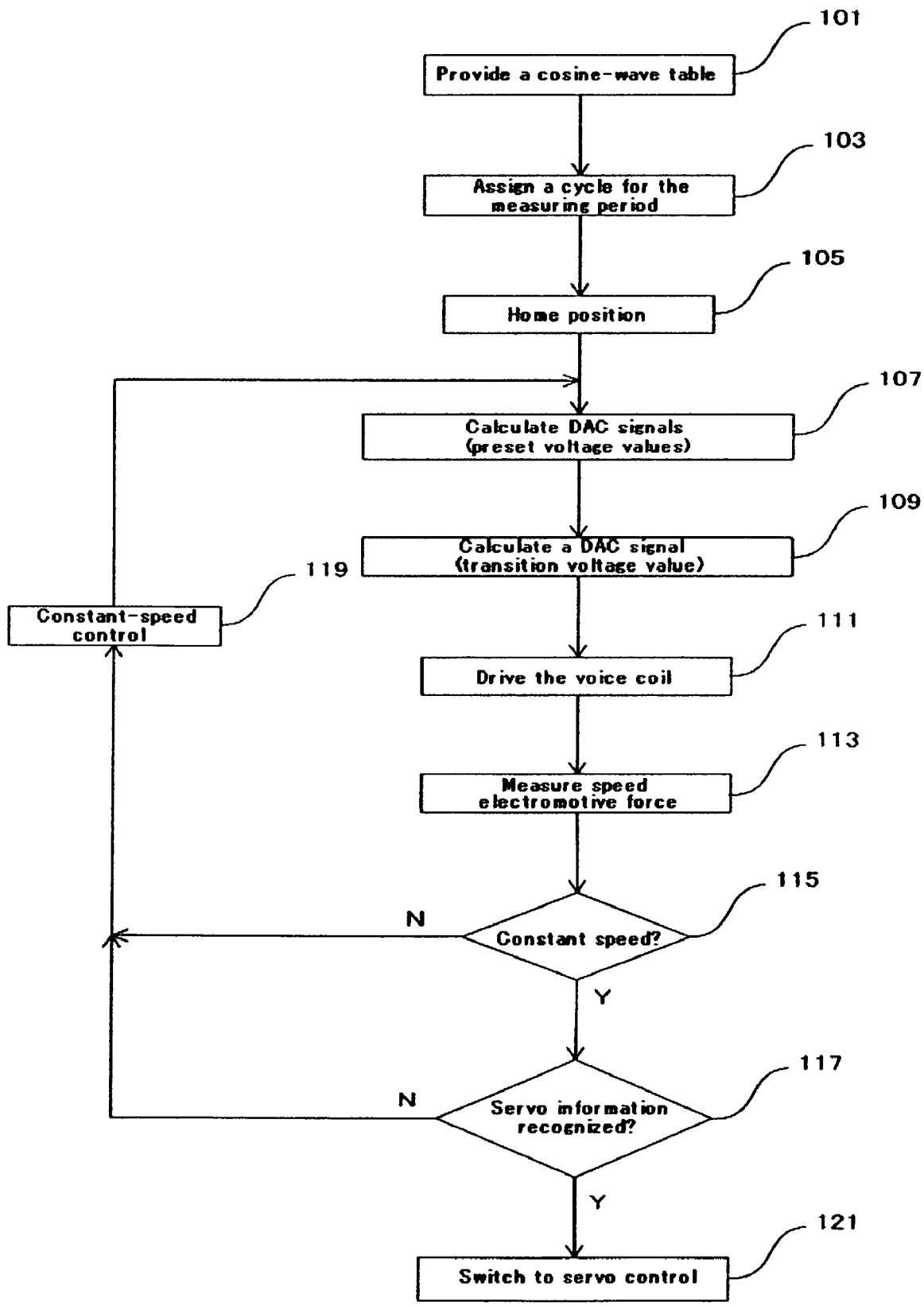
FIG. 8 is a flowchart showing a procedure for loading an actuator assembly located at its home position.

FIG. 8 is a flowchart showing a procedure for loading the actuator assembly 15 located at its home position. In block 101, the cosine-wave table is stored in the ROM 67 of the magnetic disk drive 10, and a program for implementing the loading/unloading method according to embodiments of the present invention, and a program for generating a VCM control voltage are included in the firmware 71. In block 103, the measuring period P3 is set and incorporated in the firmware 71. In block 105, the actuator assembly 15 is located at the home position with the lift tab 19 engaged with the ramp mechanism 20 and the coil holder 25 attracted to the latch magnet 23.

In block 107, the MPU 61 calculates DAC input values corresponding to preset voltage values for releasing the coil holder 25 from the latch magnet 23. In block 109, the MPU 61 calculates a DAC input value corresponding to a transition voltage value. In block 111, the DAC 57 converts the digital DAC input data into an associated analog VCM control voltage Vvcm. The VCM driver 51 then supplies to the voice coil 29 a VCM current Ivcm corresponding to the VCM control voltage Vvcm, and thus moves the actuator assembly 15 in the direction of arrow B in FIG. 6. In block 113, the MPU 61 that has received from the ADC 55 during the measuring period, the coil end voltage value developed at the output end of the VCM driver 51, recognizes the coil end voltage value as the speed electromotive force Ebemf. In block 115, the MPU 61 judges whether the actuator assembly 15 is in operation at a constant speed.

If the rotating speed of the actuator assembly 15 is not constant, the process is shifted to block 119, in which the MPU 61 then conducts DAC input data calculations for actuator assembly constant-speed control, based on the built-in algorithm of the firmware 71. The MPU 61 conducts the constant-speed control by calculating a DAC signal intended to obtain the VCM current Ivcm that the MPU has calculated using expression (1). In expression (1), Vtagt denotes a target speed and Verr denotes a speed deviation between the target speed Vtagt and an actual speed Vbemf calculated from the speed electromotive force Ebemf. Also, Kp is a coefficient of a proportional term and Ki is a coefficient of an integral term.

In block 117, the magnetic head 18 moves above the magnetic disk 13 and reads servo data to judge whether the MPU 61 has recognized the servo information. If the MPU 61 has not recognized the servo information, the MPU 61 continues the constant-speed control in block 119. If the MPU 61 has recognized the servo information, the MPU 61 proceeds to block 121 to start the constant-speed control. The MPU 61 may be constructed so that after starting the constant-speed control, the MPU generates a step-like VCM control voltage Vvcm not including a transition voltage value. During servo control of the actuator assembly 15, if a command is received from the host apparatus 73 or an internal event occurs and thus the actuator assembly 15 is to be unloaded, the process from blocks 107 to 119 are repeated to move the actuator assembly 15 to the home position and cause the latch magnet 23 to attract the coil holder 25.

Figure 9B:
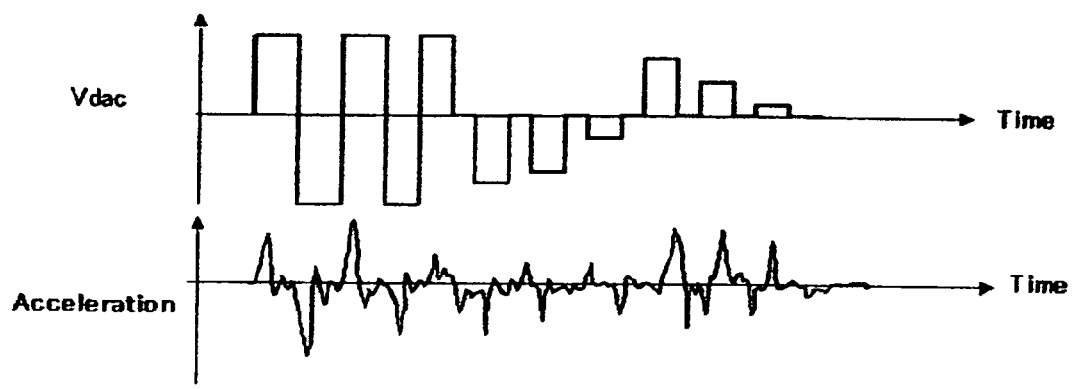
Figure 9B:
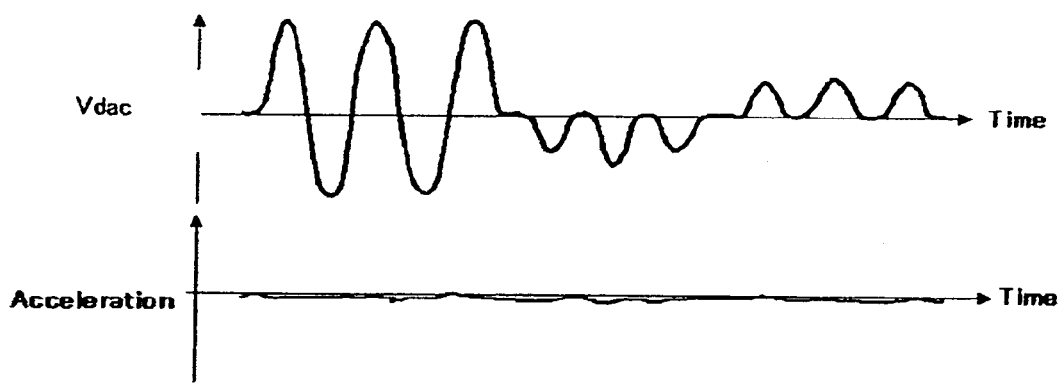
Figure 1:
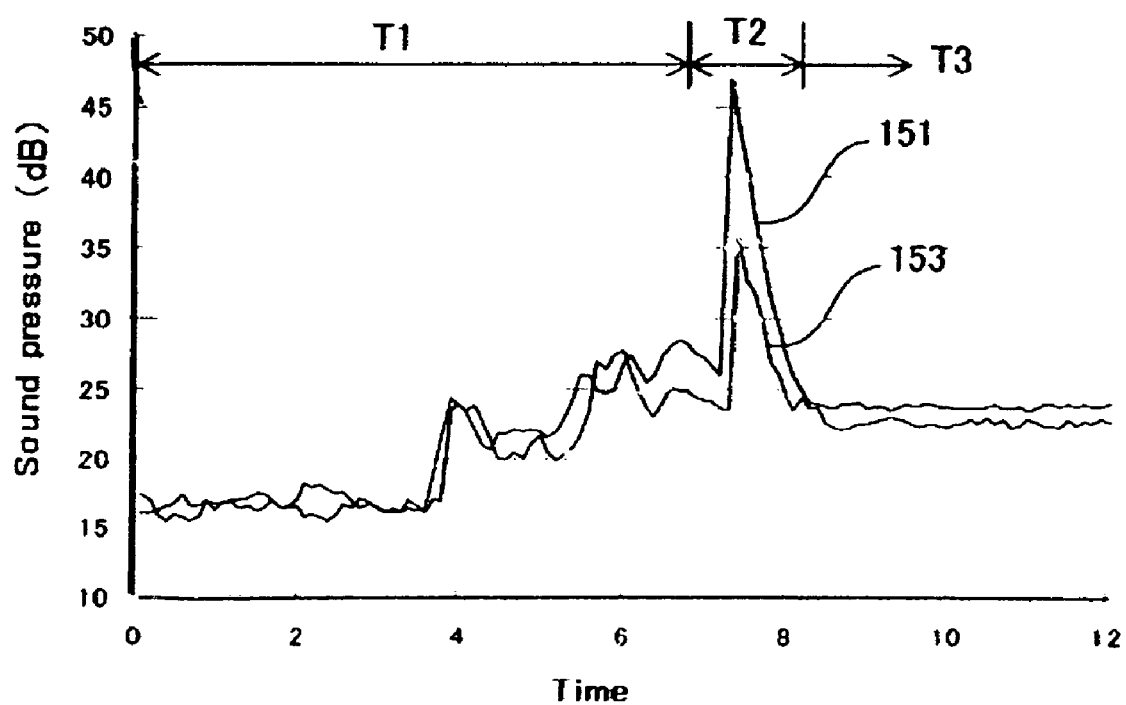

FIG. 9(A) is a diagram that shows the changes in acceleration of loading of the actuator assembly with the VCM driver impressed with a conventional VCM control voltage Vdac. FIG. 9(B) is a diagram that shows the changes in acceleration of loading of the actuator assembly with the VCM driver impressed with a VCM control voltage Vdac including a cosine wave of the present embodiment. In both cases, the acceleration was measured using an acceleration sensor attached to the surface of an enclosure of the same magnetic disk drive. The width of a time base in FIG. 9 denotes a time period from the time when the lift tab of the actuator assembly leaves the home position and starts sliding along the sliding surface of the ramp mechanism to the time when the lift tab starts moving above the magnetic disk. In the case of the VCM control voltage Vdac generating the conventional rectangular wave, a mechanical vibration sound is observed simultaneously with the occurrence of such a waveform of the acceleration as shown in FIG. 9(A).

In contrast to this, in the construction with the VCM control voltage Vdac including a cosine wave in transition periods as shown in FIG. 9(B), the acceleration is reduced very significantly, which results in such a silent state that makes essentially no mechanical vibration sound audible. An actual accelerating noise level in the case of FIG. 9(B) is approximately 10 dB lower than in the case of FIG. 9(A).

FIG. 10 is a diagram with a line 151 denoting the changes in a sound pressure in the case of loading of the actuator assembly with the VCM driver impressed with the conventional VCM control voltage Vdac, and a line 153 denoting the changes in a sound pressure in the case of loading of the actuator assembly with the VCM driver impressed with the VCM control voltage Vdac including a cosine wave of the present embodiment. The sound pressures were measured with microphones installed around the same magnetic disk drive, and under the same conditions, except for the applied VCM control voltage Vdac. A time base denotes an elapsed time from power-on of the magnetic disk drive. Time period T1 is the time period from when the spindle motor starts rotation to when the spindle motor reaches to a constant speed. Time period T2 is the time period of a state in which the lift tab is present on the ramp mechanism with the VCM control voltage Vdac applied to the VCM driver to supply a current to the voice coil placed at a home position thereof. Time period T3 is the time period from when the lift tab leaves the ramp mechanism to when the lift tab arrives at a position above the magnetic disk.

A difference of approximately 12 dB is detected between a peak sound pressure level of the line 151 and that of the line 153 during time period T2 from when the actuator assembly is released from the attraction of the latch magnet to when the lift tab starts moving above the magnetic disk under the constant-speed control. The magnetic disk drive according to the present embodiment, therefore, is particularly suitable for mounting in a host apparatus used under a silent environment.

While the present invention has been described above taking as an example the particular embodiments shown in the accompanying drawings, the invention is not limited to these embodiments and it goes without saying that as far as the advantageous effects of the invention are fully utilized, any configuration heretofore known may be applied to the invention.

What is claimed is:

1. A magnetic disk drive comprising:

a magnetic disk;
an actuator assembly having a magnetic head and a voice coil;
a voice coil motor (VCM) driver that supplies an electric current to the voice coil;
a digital/analog converter that supplies to the VCM driver a VCM control voltage comprising a first preset voltage value, a second preset voltage value, and a transition voltage value of a substantially cosine wave, the transition voltage value interconnecting the first preset voltage value and the second preset voltage value; and
a processor that supplies input signals to the digital/analog converter, wherein:
the digital/analog converter further supplies a preset third voltage value to the VCM driver;
the second preset voltage value is greater than the first preset voltage value and the preset third voltage value; and
the processor supplies to the digital/analog converter an input signal adapted to interconnect the first preset voltage value and the second preset voltage value via a cosine wave of a half cycle of "0 to $\pi$" and interconnect the second preset voltage value and the preset third voltage value via a cosine wave of a half cycle time of "$\pi$ to $2\pi$".

2. A magnetic disk drive comprising:
a magnetic disk;
an actuator assembly having a magnetic head and a voice coil;
a VCM driver that supplies an electric current to the voice coil;
a digital/analog converter that supplies to the VCM driver a VCM control voltage comprising a first preset voltage value, a second preset voltage value, and a transition voltage value of a substantially cosine wave, the transition voltage value interconnecting the first preset voltage value and the second preset voltage value;-and
a processor that supplies input signals to the digital/analog converter; and
a nonvolatile memory in which a cosine-wave table for creating the transition voltage value is stored, wherein the processor refers to the cosine-wave table and generates a signal associated with the transition voltage value.

3. The magnetic disk drive according to claim 2, wherein the transition voltage value takes a time-differentiated value of zero at a boundary with respect to the first preset voltage value and at a boundary with respect to the second preset voltage value.

4. The magnetic disk drive according to claim 2, wherein the transition voltage value is a value obtained by adding to the cosine wave an amplitude value which is half a difference between the first preset voltage value and the second preset voltage value.

5. The magnetic disk drive according to claim 2, wherein the cosine wave associated with the transition voltage value is formed with a half cycle of wavelength between a connecting position with respect to the first preset voltage value and a connecting position with respect to the second preset voltage value.

6. The magnetic disk drive according to claim 2, wherein the first preset voltage value is a plus voltage value and the second preset voltage value is a zero voltage value.

7. The magnetic disk drive according to claim 2, wherein both the first preset voltage value and the second preset voltage value are values other than zero.

8. The magnetic disk drive according to claim 2, wherein the digital/analog converter supplies a voltage value of a pulse width modulation (PWM) scheme or pulse frequency modulation (PFM) scheme to the VCM driver.

9. The magnetic disk drive according to claim 2, further comprising a latch magnet that magnetically attracts the actuator assembly.

10. The magnetic disk drive according to claim 2, further comprising a voltage detection circuit that measures a coil end voltage developed in the voice coil.

11. The magnetic disk drive according to claim 2, further comprising a ramp mechanism onto which the magnetic head is unloaded.

12. The magnetic disk drive according to claim 11, wherein the digital/analog converter supplies the transition voltage value to the VCM driver during a time period from a start of loading of the magnetic head from the ramp mechanism to a position above the magnetic disk, to a start of servo control by the processor.

13. The magnetic disk drive according to claim 11, wherein the digital/analog converter supplies the transition voltage value to the VCM driver during a time period from a start of unloading of the magnetic head currently flying above the magnetic disk, to completion of a movement of the magnetic head to a home position on the ramp mechanism.

14. The magnetic disk drive according to claim 2, wherein the digital/analog converter supplies the transition voltage value to the VCM driver while the actuator assembly is being servo-controlled with the magnetic head flying above the magnetic disk.

15. A magnetic disk drive comprising:
a magnetic disk;
an actuator assembly having a magnetic head and a voice coil;
a VCM driver that supplies an electric current to the voice coil;
a digital/analog converter that supplies to the VCM driver a VCM control voltage comprising a first preset voltage value, a second preset voltage value, and a transition voltage value of a substantially cosine wave, the transition voltage value interconnecting the first preset voltage value and the second preset voltage value;
a processor that supplies input signals to the digital/analog converter; and
a voltage detection circuit that measures a coil end voltage developed in the voice coil, wherein the processor detects speed electromotive force from the coil end voltage measured within a measuring period during which the back electromotive force occurring in a resistor and inductance element of the voice coil is small compared to the VCM control voltage.

16. A system for driving in a magnetic disk drive an actuator assembly which has a voice coil, the system comprising:
a power supply circuit that supplies electric power to the voice coil; and
a control circuit that controls the power supply circuit to supply to the voice coil a first preset voltage value, a second preset voltage value, and a transition voltage value of a substantially cosine wave, wherein the transition voltage value interconnects the first preset voltage value and the second preset voltage value, and wherein the control circuit includes a memory which stores a cosine-wave table of cosine-wave data which takes a required transition period as half wavelength.

17. A method in which an actuator assembly with a magnetic head in a magnetic disk drive is loaded from/unloaded onto a ramp mechanism, the loading/unloading method comprising:

a step in which the magnetic disk drive assigns a control period for supplying a voltage to a VCM driver adapted to supply an electric current to a voice coil, and a measuring period for supplying no voltage to the VCM driver;

a step in which the magnetic disk drive assigns a setting period for supplying a required preset voltage value during the control period, and a transition period for supplying a transition voltage value of a substantially cosine wave;

a step in which a VCM control voltage that includes the required preset voltage value and the transition voltage value is supplied to the VCM driver and thus the magnetic head is moved from the ramp mechanism, towards a magnetic disk;

a step in which, based on speed electromotive force that has occurred in the voice coil, constant-speed control is performed on the actuator assembly; and a step in which, during a time period from completion of the transition period to a start of the next transition period, a processor measures the speed electromotive force.

\* \* \* \* \*